United States Patent
Itoh et al.

(10) Patent No.: US 7,798,660 B2
(45) Date of Patent: Sep. 21, 2010

(54) SURFACE ILLUMINATION APPARATUS, AND LIQUID CRYSTAL DISPLAY WITH THE SAME

(75) Inventors: Tatsuo Itoh, Osaka (JP); Takayuki Nagata, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 314 days.

(21) Appl. No.: 12/062,407

(22) Filed: Apr. 3, 2008

(65) Prior Publication Data

US 2008/0247150 A1 Oct. 9, 2008

(30) Foreign Application Priority Data

Apr. 4, 2007 (JP) .............. 2007-098155

(51) Int. Cl.
*F21V 9/14* (2006.01)
*G02F 1/1335* (2006.01)

(52) U.S. Cl. .............. 362/19; 362/259; 362/268; 362/607; 349/96

(58) Field of Classification Search .............. 362/606, 362/607, 608, 259, 268, 293, 19; 359/495; 349/96

See application file for complete search history.

(56) References Cited

U.S. PATENT DOCUMENTS 3,581,202 A * 5/1971 Pelenc et al. .............. 324/96
4,777,358 A * 10/1988 Nelson .............. 250/225
6,081,367 A * 6/2000 Yokoyama et al. .............. 359/337.2
7,119,957 B2 * 10/2006 Itoh et al. .............. 359/495
2006/0056025 A1 * 3/2006 Li .............. 359/495
2007/0153862 A1 * 7/2007 Shchegrov et al. .............. 372/50.124

FOREIGN PATENT DOCUMENTS

| JP | 8-304739 | 11/1996 |
|---|---|---|
| JP | 2002-169480 | 6/2002 |
| WO | 99/49358 | 9/1999 |

* cited by examiner

*Primary Examiner*—Stephen F. Husar
*Assistant Examiner*—Peggy A. Neils
(74) *Attorney, Agent, or Firm*—Wenderoth, Lind & Ponack, L.L.P.

(57) ABSTRACT

A surface illumination apparatus includes: a light source; an end-surface light-guide portion which guides light emitted from the light source in a long-side direction thereof and generates emitted light in a short-side direction thereof; and a light guide plate which allows the emitted light to be incident upon an end-surface portion thereof and emits the incident light from one main-surface portion thereof. The end-surface light-guide portion includes a plurality of polarization control portions arranged in the long-side direction; the plurality of polarization control portions each has a half-wave plate and a polarizing prism; the end-surface light-guide portion emits the emitted light in the form of either of S-polarized light and P-polarized light, using the plurality of polarization control portions; and the light guide plate emits, as output light, either of S-polarized light and P-polarized light from the one main-surface portion.

15 Claims, 8 Drawing Sheets

SURFACE ILLUMINATION APPARATUS, AND LIQUID CRYSTAL DISPLAY WITH THE SAME

BACKGROUND OF THE INVENTION

1. Field of the Invention

The present invention relates to a surface illumination apparatus in which the polarization characteristic of light is utilized, and a liquid crystal display provided with this surface illumination apparatus. Particularly, it relates to a surface illumination apparatus in which the polarization characteristic of a laser beam is utilized by using a laser light source as a source for light emission, and a liquid crystal display provided with this surface illumination apparatus.

2. Description of the Background Art

A liquid crystal display displays an image by controlling the transmission quantity of a beam of light projected from its rear surface, using an electro-optical effect by the orientation of liquid-crystal molecules. In general, this method requires a surface illumination apparatus called a backlight unit which is formed by a vacuum fluorescent display and the like. In such a liquid crystal display, in recent years, its screen size has become increasingly large, and even a 50-inch size display for television has been put to practical use. At the same time, however, its power consumption increases as its size is larger, and thus, the necessity arises for the development of an art of lessening the power consumption.

As described above, a liquid crystal display is not a self-light-emission display, and thus, the power consumed in a light source used for a backlight unit is greater than the power consumed in a liquid-crystal display panel. In order to reduce the power consumption of the backlight-unit light source to a low level, a light source capable of emitting light efficiently needs to be used, as well as the backlight-unit illumination light needs to pass efficiently through the liquid-crystal display panel. These are serious problems to be solved.

As such a light source, instead of a conventionally-used vacuum fluorescent display, a light-emitting diode or a laser light source has been considered. A light-emitting diode is already put to practical use. However, numerous light-emitting diodes or laser light sources are necessary for obtaining illumination light which has a large area and a high intensity. This increases the power consumption of such light sources and raises the cost of mounting many such devices. Besides, in a backlight unit provided with a light-emitting diode, the range of color reproduction is enlarged to thereby enhance the picture quality. However, a large number of light-emitting diodes hinder an adequate reduction in the power consumption.

Therefore, as an important task, an art for a backlight unit has to be developed for reducing the number of light sources used in the backlight unit, as well as not wasting the illumination light thereof and allowing this illumination light to efficiently pass through a liquid-crystal display panel. In a liquid crystal display, illumination light projected from a backlight unit passes through the polarizing plate of a liquid-crystal display panel. Thereby, only half the quantity of light radiated from a light source is effectively used in practice. Hence, if illumination light polarized in advance passes through the polarizing plate, the illumination light from the backlight unit could be utilized at a higher light-usage efficiency.

On the basis of this approach, a collimating plane light source is disclosed (e.g., refer to Japanese Patent Laid-Open Publication No. 2002-169480). This collimating plane light source is configured by: a laser light source which has a predetermined emission width; a reflecting member which divides light emitted from the laser light source into a plurality of beams and reflects each beam in parallel with each other in a predetermined direction; and a deflecting member which includes a plurality of half mirrors that reflect each beam reflected by the reflecting member in a substantially perpendicular direction to its parallel plane and transmit the rest.

In this method, there is no need to provide a large number of laser light sources. Hence, a high-definition collimating plane light source can be obtained using a simple configuration with a single laser light source. Besides, a display element and a display unit with a high definition can be obtained which have less of a viewing angle dependency and require no backlight such as a fluorescent lamp and no color filter.

Furthermore, a polarization illumination apparatus is disclosed (e.g., refer to Japanese Patent Laid-Open Publication No. 8-304739). This polarization illumination apparatus includes: a light source portion in a lamp which emits light polarized in random directions; a first lens plate formed by a plurality of rectangular collective lenses for forming a plurality of secondary light-source images; and a second lens plate which is arranged near the formation position of the plurality of secondary light-source images and is provided with a polarization-separation prism array having a collective-lens array, a polarization beam splitter and a λ/2 phase-difference plate, as well as an emission-side lens.

Thereby, the first lens plate forming an integrator optical system generates minute secondary light-source images, and at this stage, polarized illumination light is separated. This helps restrain an optical path from spreading spatially when polarized illumination light is separated. Therefore, even if a polarization-conversion optical system is provided, the polarization illumination apparatus becomes smaller and useful for a liquid crystal projector.

Moreover, an image display including a lamp array as a light source according to the above described polarization illumination art is disclosed (e.g., refer to International Publication Pamphlet No. 99/49358). This image display is designed to make good use of light from the light source at a high light-usage efficiency. Simultaneously, an illumination apparatus is formed in one body to thereby make the image display smaller.

In the collimating plane light source disclosed in Japanese Patent Laid-Open Publication No. 2002-169480 described above, a beam of light emitted from the single laser light source is deflected by the reflecting member and is reflected in the substantially perpendicular direction by the deflecting member. However, no account is taken of control of the polarization of the laser beam. Since the polarization of the laser beam is not controlled, the laser beam is not uniformly polarized.

In the polarization illumination apparatus disclosed in Japanese Patent Laid-Open Publication No. 8-304739 described above, a beam of light emitted from the lamp is uniformly polarized by the plurality of lenses, the polarization-conversion optical system and the lens array. Then, it is enlarged and emitted. Thereby, the shape of the emitted beam becomes larger in the emission direction, thus making it harder to reduce the thickness of a surface illumination apparatus for a flat large-screen liquid-crystal display. Neither a disclosure nor a suggestion is given about information on such a thinning art.

The image display given in International Publication Pamphlet No. 99/49358 described above requires the array light source having a plurality of lamps arranged two-dimensionally. This causes the problem of increasing its power consumption and raising the cost of parts. In addition, a thin-andflat large-screen image display is difficult to realize using the image display having this configuration. Besides, neither a description nor a suggestion is given about preserving a polarized laser beam using a laser light source and a light guide plate and allowing the uniformly-polarized laser beam as a parallel beam from the thinner light guide plate to irradiate a liquid crystal panel.

SUMMARY OF THE INVENTION

It is an object of the present invention to provide a surface illumination apparatus which is capable of emitting light having a uniform intensity as output light by unifying the polarization of light in the form of either S-polarized light or P-polarized light, utilizing light more efficiently, reducing power consumption and reducing the thickness of this apparatus, as well as a liquid crystal display provided with the apparatus.

A surface illumination apparatus according to an aspect of the present invention includes: a light source; an end-surface light-guide portion which guides light emitted from the light source in a long-side direction thereof and generates emitted light in a short-side direction thereof; and a light guide plate which allows the emitted light to be incident upon an end-surface portion thereof and emits the incident light from one main-surface portion thereof, in which: the end-surface light-guide portion includes a plurality of polarization control portions arranged in the long-side direction; the plurality of polarization control portions each have a half-wave plate and a polarizing prism; the end-surface light-guide portion emits the emitted light in the form of either of S-polarized light and P-polarized light, using the plurality of polarization control portions; and the light guide plate emits, as output light, either of S-polarized light and P-polarized light from the one main-surface portion.

A liquid crystal display according to another aspect of the present invention includes: a liquid-crystal display panel; and a backlight illumination unit which illuminates the liquid-crystal display panel from behind, in which the backlight illumination unit is the above described surface illumination apparatus.

The surface illumination apparatus according to the present invention is capable of utilizing light from a light source without wasting, and emitting the light with uniformly polarized. This helps make the luminance higher, improve the light usage efficiency significantly and reduce the power consumption. In addition, the liquid crystal display provided as the backlight illumination unit with the surface illumination apparatus according to the present invention is capable of utilizing uniformly polarized light. This makes it possible to heighten the luminance, decrease the power consumption and lower the cost. Besides, the speckle noise can be sufficiently reduced.

These and other objects, features, aspects and advantages of the present invention will become more apparent upon a reading of the following detailed description with reference to the accompanying drawings.

DESCRIPTION OF THE PREFERRED EMBODIMENTS

Figure 1:
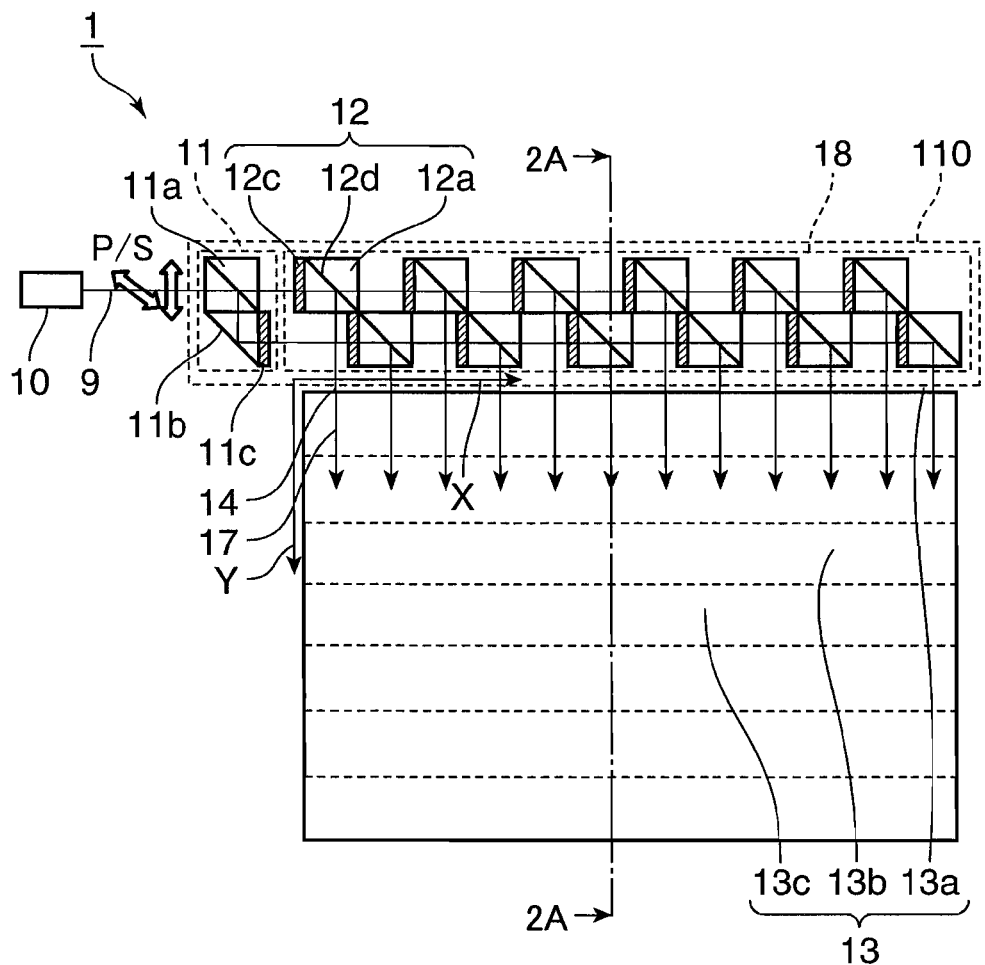
FIG. 1 is a top plan view showing a configuration of a surface illumination apparatus according to a first embodiment of the present invention.

Embodiments of the present invention will be below described with reference to the drawings. Herein, identical component elements are given the same reference characters and numerals, and thus, their description is omitted in some cases.

First Embodiment

Figure 2:
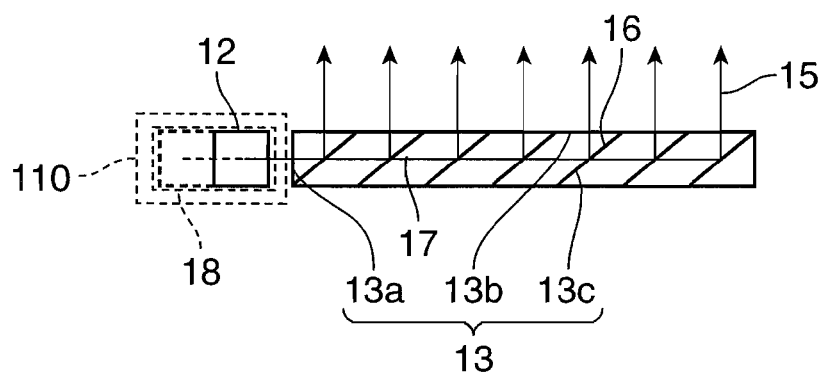
FIG. 2 is a schematic sectional view of the surface illumination apparatus, seen along a 2A-2A line shown in FIG. 1.

FIG. 1 and FIG. 2 show a schematic configuration of a surface illumination apparatus 1 according to a first embodiment of the present invention. FIG. 1 is a top plan view showing a typical configuration of the surface illumination apparatus 1. FIG. 2 is a schematic sectional view of the surface illumination apparatus 1, seen along a 2A-2A line of FIG. 1. In FIG. 1 and FIG. 2, each component element of the surface illumination apparatus 1 is arranged apart from each other for the purpose of helping understand their configurations. However, in the actual configurations, they are disposed on a base plate (not shown), in a framework (not shown) or the like, and all of them are united and fixed. The configuration of the surface illumination apparatus 1 according to this embodiment will be below described based on these figures and the like.

As shown in FIG. 1 and FIG. 2, the surface illumination apparatus 1 includes: a laser light source 10; an end-surface light-guide portion 110 which guides a laser beam 9 emitted from the laser light source 10 in a long-side direction X (an X-axis direction shown in FIG. 1) and generates S-polarized light as emitted light 14 in a short-side direction Y (a Y-axis direction shown in FIG. 1); and a light guide plate 13 which allows the emitted light 14 to be incident upon an end-surface portion 13a and emits this incident light from one main-surface portion 13b. The end-surface light-guide portion 110 includes a plurality of polarization control portions 12 arranged in the long-side direction X. Each polarization control portion 12 is formed by combining a polarizing prism 12a and a half-wave plate 12c. The polarization control portions 12 generate S-polarized light as the emitted light 14, and thereafter, emits this S-polarized light as output light 15 from the one main-surface portion 13b of the light guide plate 13. An optical system (not shown) such as a collimating lens converts the laser beam 9 from the laser light source 10 into a substantially parallel light beam, which is incident upon the end-surface light-guide portion 110.

The surface illumination apparatus 1 can also output a P-polarized laser beam as the output light 15 as follows. In FIG. 1, a half-wave plate (not shown) is disposed over the full length of the long-side direction X between the end-surface light-guide portion 110 and the end-surface portion 13a of the light guide plate 13. Thereby, the emitted light 14 as the S-polarized light from the end-surface light-guide portion 110 is converted into P-polarized light. This P-polarized light is emitted as the output light 15.

This configuration is helpful in unifying the polarization of the randomly-polarized laser beam 9 incident from the laser light source 10 and utilizing the laser beam 9 without wasting. This makes it possible to emit a laser beam with a uniform intensity and polarization over the whole surface as the output light 15 from the one main-surface portion 13b of the light guide plate 13. Furthermore, if necessary, the output light 15 emitted from the surface illumination apparatus 1 can be uniformly transformed into not only S-polarized light, but also P-polarized light. This realizes the surface illumination apparatus 1 capable of utilizing the laser beam 9 from the laser light source 10 more efficiently. Simultaneously, its power consumption can be reduced. Moreover, if this surface illumination apparatus 1 is used as the backlight illumination unit, the liquid crystal display requires no polarizing plate on the incidence side of a laser beam. This helps heighten the luminance, decrease the power consumption and lower the cost of the liquid crystal display.

As shown in FIG. 1 and FIG. 2, bending mirror portions 13c are arranged in a plurality of rows inside of the light guide plate 13. The bending mirror portions 13c are each formed with a reflection surface 16, for example, made of a thin aluminum-evaporated film or the like. The bending mirror portions 13c reflect a part of the emitted light 14 and transmit a part thereof after the emitted light 14 is incident upon the end-surface portion 13a of the light guide plate 13. Then, S-polarized light or P-polarized light is emitted as the output light 15 from the one main-surface portion 13b.

Specifically, each bending mirror portion 13c functions as a half mirror and reflects a part of a laser beam 17 guided there perpendicularly toward the one main-surface portion 13b. It transmits the rest of the laser beam 17 toward the next bending mirror portion 13c. The light guide plate 13 is made of a resin material which is transparent and excellent in optical characteristics or molding property. Particularly, it should preferably be made of an acrylic resin or a polyolefin-system resin which generates less birefringence. A reflecting mirror which reflects S-polarized light may be used as the rearmost bending mirror portion 13c not followed by any bending mirror portion.

According to this configuration, each bending mirror portion 13c of the light guide plate 13 reflects, toward the one main-surface portion 13b, a part of the S-polarized light (or P-polarized light) incident upon the light guide plate 13 from the end-surface light-guide portion 110 and transmits apart thereof toward the succeeding bending mirror portion 13c.

Hence, the reflectance and transmittance of each bending mirror portion 13c can be adjusted to thereby emit light outputted from the one main-surface portion 13b as the output light 15 further uniform over the surface and evenly polarized. This contributes to enhancing the light usage efficiency.

The several rows of bending mirror portions 13c may also be arranged in such a way that the reflectance of the reflection surface 16 becomes gradually greater as the laser beam 17 goes ahead in the short-side direction Y. Or, they may also be arranged in such a way that the distance between adjacent reflection surfaces 16 in the bending mirror portions 13c becomes shorter in the short-side direction Y. This is useful even in the case where the laser beam 17 is reflected by the reflection surfaces 16 inside of the light guide plate 13 to thereby attenuate the output of the laser beam 17 gradually. In this case, the output of the output light 15 from the surface illumination apparatus 1 can be further unified on the surface of the one main-surface portion 13b of the light guide plate 13.

Furthermore, as shown in FIG. 1 and FIG. 2, the end-surface light-guide portion 110 includes a light introduction portion 11 upon which the laser beam 9 is incident, and a light distribution portion 18. The light introduction portion 11 includes a polarizing prism 11a, a mirror 11b and a half-wave plate 11c. The light distribution portion 18 includes the plurality of polarization control portions 12. Each polarization control portion 12 includes the polarizing prism 12a and the half-wave plate 12c. The polarizing prisms 11a and 12a allow the laser beam 9 to branch into S-polarized light or P-polarized light.

Specifically, the light introduction portion 11 of the end-surface light-guide portion 110 allows the incident laser beam 9 to branch into two parallel branching beams, using optical elements such as the polarizing prism 11a, the mirror 11b and the half-wave plate 11c. It introduces these P-polarized laser beams into the light distribution portion 18 placed along the long-side direction X. Herein, the polarizing prism 11a is, for example, a dice-shaped polarization beam splitter formed by coating the inclined surface of a 45-degree right-angle prism with a dielectric multilayer film and gluing such prisms together. The half-wave plate 11c is formed, for example, by a material having a birefringence property such as a crystal.

In this embodiment, the light distribution portion 18 of the end-surface light-guide portion 110 shown in FIG. 1 is provided with the polarization control portions 12 as many as necessary and sufficient alternately (zigzag) in two rows in the long-side direction X of the light guide plate 13. Each polarization control portion 12 is made up of a combination of the polarizing prism 12a and the half-wave plate 12c.

Each polarizing prism 12a of the light distribution portion 18 is configured, in the same way as the polarizing prism 11a of the light introduction portion 11, for example, by a dice-shaped polarization beam splitter formed by coating the inclined surface of a 45-degree right-angle prism with a dielectric multilayer film and gluing such prisms together. Similarly, each half-wave plate 12c of the light distribution portion 18 is formed, in the same way as the half-wave plate 11c of the light introduction portion 11, for example, by a material having a birefringence property such as a crystal. The incidence end and emission end of each polarization control portion 12 arranged alternately come into contact with air. They should thus desirably be coated with an anti-reflection film. Or, an optical transparent body such as optical glass should be fixed with a transparent optical adhesive in the space between each polarization control portion 12 arranged alternately and an antireflection film should be formed.

According to this configuration, even if the randomly-polarized laser beam 9 is incident from the laser light source 10, the light introduction portion 11 and the light distribution portion 18 unify the polarization. Then, they introduce at least two branching beams as the emitted light 14 into the light guide plate 13. This helps make good use of the light quantity of the randomly-polarized laser beam 9 to thereby improve the light usage efficiency.

In addition, an optical deflecting device such as a galvanomirror, a polygon mirror and an acousto-optic device may minutely deflect or scan the laser beam 9 of FIG. 1 perpendicularly to its optical axis. This minute length means a length by which the laser beam 9 would not leak from the end-surface light-guide portion 110. This configuration is helpful in deflecting or scanning light in the light guide plate 13. This makes it possible to obtain a further uniform distribution of light quantity. Besides, the light which illuminates a specific point is changed and emitted in time series from several places of the light guide plate 13. This helps emit the output light 15 whose speckle noise is sufficiently reduced.

Figure 3:
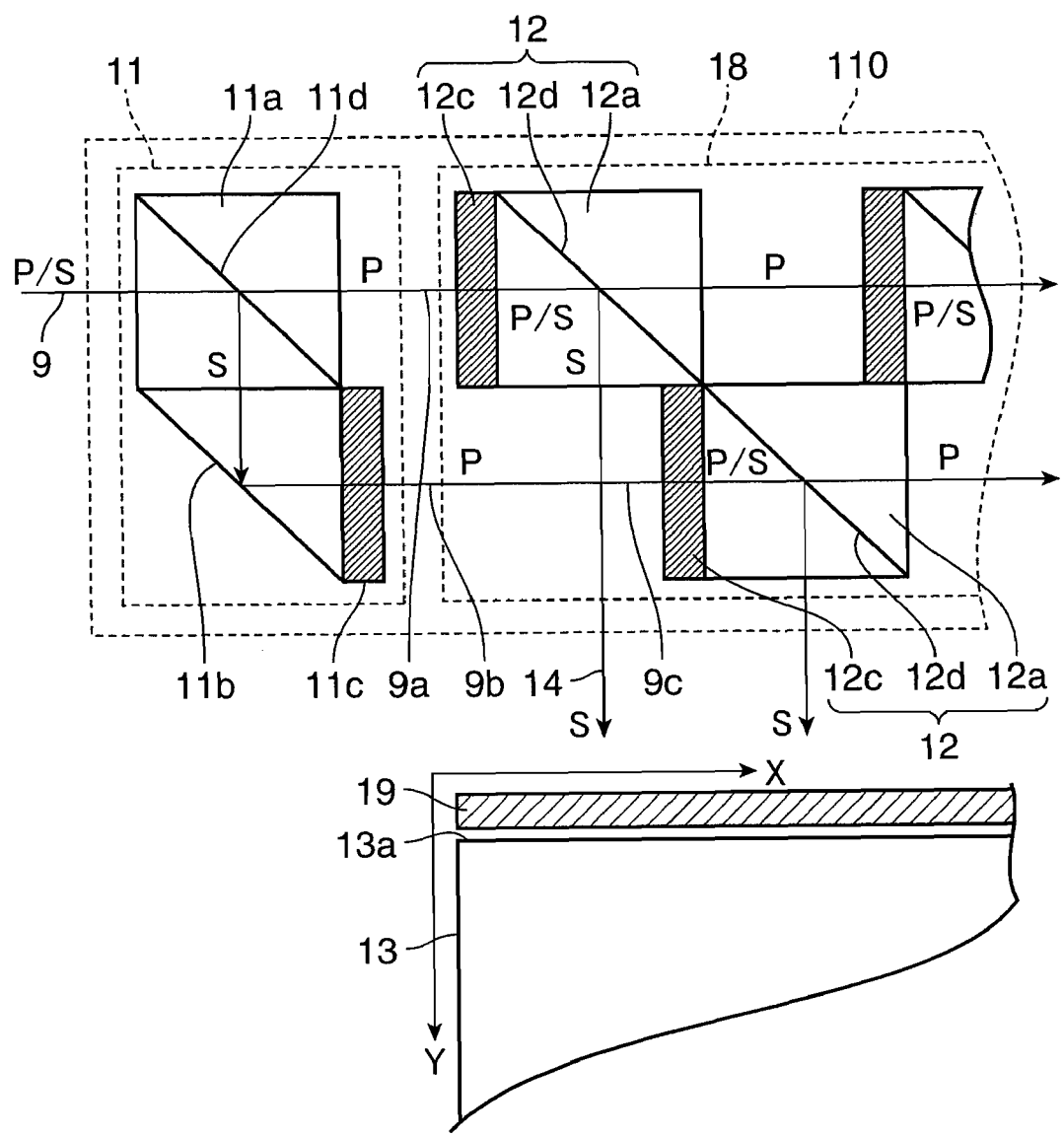
FIG. 3 is an enlarged top plan view of a main part of an end-surface light-guide portion in the surface illumination apparatus according to the first embodiment.

FIG. 3 is an enlarged top plan view of a main part of the end-surface light-guide portion 110 in the surface illumination apparatus 1 according to this embodiment. As shown in FIG. 3, for example, the laser beam 9 not uniformly polarized from a laser light source (not shown) is a beam of light (hereinafter, referred to as the "P/S polarized light") containing both components of P-polarized light and S-polarized light.

The laser beam 9 as the P/S polarized light is incident on the light introduction portion 11. Upon being incident on a polarization beam splitter surface (hereinafter, referred to as the "PBS surface") 11d of the polarizing prism 11a, almost one-hundred percent of the P-polarized light of the laser beam 9 as the P/S polarized light is transmitted in the long-side direction X. In contrast, the S-polarized light of the laser beam 9 is reflected at substantially 100%. Then, it is reflected by the mirror 11b, turned in the long-side direction X and converted into P-polarized light by the half-wave plate 11c.

Thereby, the laser beam 9 as the P/S polarized light passes through the light introduction portion 11 of the end-surface light-guide portion 110 and branches into two parallel P-polarized laser beams 9a and 9b. These beams are introduced into the light distribution portion 18 and propagated in the long-side direction X. The polarization beam splitter surface may be a surface formed by a dielectric film or a metal film. Or, it can also be a form birefringence polarization surface obtained by creating a structure having an unevenness or the like below a wavelength thereof on a substrate. The form birefringence polarization surface is less dependent upon the wavelength of incident light to thereby realize a good polarization-separation characteristic over the full band of visible light.

The laser beams 9a and 9b each pass through the half-wave plate 12c of the polarization control portion 12 and are converted into a P/S polarized laser beam. A PBS surface 12d transmits the P-polarization component of a laser beam 9c at substantially 100%. On the other hand, the PBS surface 12d reflects the S-polarization component of a laser beam 9c at almost 100%. As shown in FIG. 3, this S-polarization component is turned at a right angle and emitted toward the end-surface portion 13a of the light guide plate 13. The polarization control portions 12 arranged alternately in two rows each have the same optical function as described above. They propagate P-polarized light in the long-side direction X and emit S-polarized light in the short-side direction Y. It allows parallel S-polarized beams to be incident upon the light guide plate 13. The rearmost polarization control portion 12 in each row is not followed by any polarization control portion. Thus, the half-wave plate 12c may convert P-polarized light into S-polarized light, which is reflected by the polarizing prism 11a. Or, the S-polarized light can also be reflected by a reflecting mirror substituted for the polarizing prism 11a.

When one wants P-polarized light to be incident upon the light guide plate 13, as shown in FIG. 3, a half-wave plate 19 may be inserted in front of the end-surface portion 13a. In this case, S-polarized light is converted into P-polarized light, and the P-polarized light is reflected by the bending mirror portions. When S-polarized light is incident upon the end-surface portion 13a, there is no need for the half-wave plate 19.

In the surface illumination apparatus 1 configured in this way according to this embodiment, each polarization control portion 12 of the end-surface light-guide portion 110 turns the half-wave plate 12c thereof around the optical axis of each laser beam 9a, 9b, 9c in such a way that it transmits each laser beam 9a, 9b. Then, each polarization control portion 12 adjusts the quantity of the S-polarized light and the P-polarized light of the transmitted laser beam 9c to thereby adjust the distribution of the quantity of light in the light guide plate 13. Specifically, a frame (not shown) for each polarization control portion 12 supports the half-wave plate 12c thereof so that it can turn around the optical axis of each laser beam 9a, 9b, 9c. A control circuit (not shown) for each polarization control portion 12 allows a turning mechanism (not shown) such as a stepping motor to turn each half-wave plate 12c.

Each half-wave plate 12c is turned so as to make constant the quantity of light reflected by the PBS surface 12d of each polarization control portion 12. For example, the turn of each half-wave plate 12c is adjusted in such a way that the ratio of an S-polarization component to the total light quantity of each laser beam 9a, 9b, 9c becomes gradually higher as each laser beam 9a, 9b, 9c propagates in the long-side direction X. Or, each half-wave plate 12c is turned, for example, in such a way that the quantity of light becomes greater in the middle of the light guide plate 13 in the long-side direction X while it becomes smaller at both ends thereof.

Therefore, the distribution of uniformly-polarized laser beams can be arbitrarily set substantially in the unit of each polarization control portion 12 along the long-side direction X of the light guide plate 13. For example, in a monitor for a computer or the like, each half-wave plate 12c can be adjusted in such a way that uniform beams are incident upon the light guide plate 13 along the long-side direction X of the end-surface light-guide portion 110. This makes it possible to obtain a uniform luminance distribution over the whole main surface of the light guide plate 13.

A display for a TV set or the like can be designed in such a way that light having a low intensity is incident upon the light guide plate 13 from both ends of the end-surface light-guide portion 110 while light having a high intensity is incident upon the light guide plate 13 from the middle thereof. This is helpful in lightening the middle of the light guide plate 13 watched by a viewer while darkening the side ends of the light guide plate 13. Since the quantity of light increases in the middle of the light guide plate 13, if the output of the laser light source 10 is kept at the same level, a viewer can feel a higher brightness effectively in practice. Conversely, if a viewer tries to feel the same brightness effectively in practice, the output of the laser light source 10 can be lowered, thus saving the power consumption.

A viewer does not feel unnatural if the ratio of the quantity of light at the side ends of the light guide plate to the quantity of light in the middle thereof is approximately eighty percent to sixty percent. In addition, if a laser beam is guided through optical fiber, it is generally polarized at random. However, according to the configuration of this embodiment, even if a laser beam is guided through optical fiber, output light having a uniformly-polarized plane can be obtained. Besides, a laser light source as the light source may also be replaced with another light source such as an LED (light emitting diode).

Figure 4:
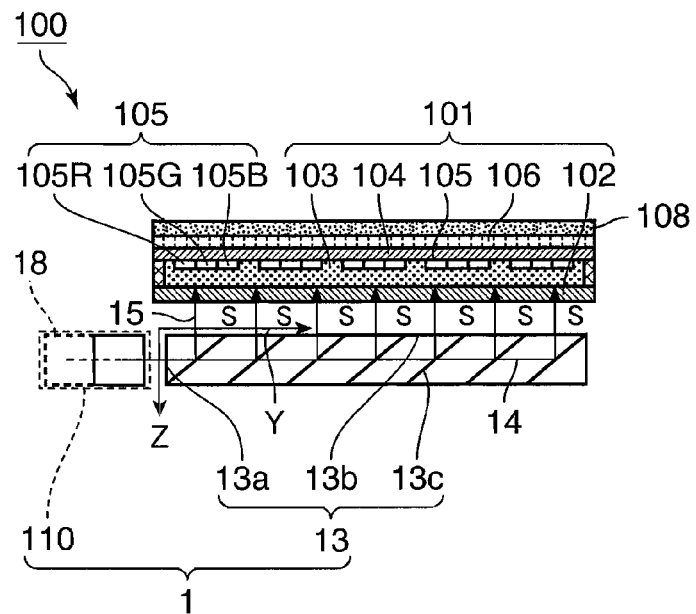
FIG. 4 is a schematic sectional view showing a configuration of a liquid crystal display provided as a backlight illumination unit with the surface illumination apparatus according to the first embodiment.

FIG. 4 is a schematic sectional view showing a configuration of a liquid crystal display provided as a backlight illumination unit with the surface illumination apparatus according to this embodiment. A liquid crystal display 100 shown in FIG. 4 includes a liquid-crystal display panel 101 and a backlight illumination unit which illuminates the liquid-crystal display panel 101. This backlight illumination unit corresponds to the above described surface illumination apparatus 1 of FIG. 1.

The liquid-crystal display panel 101 is not provided with any polarizing plate on the side of the surface illumination apparatus 1. The liquid crystal display 100 includes no polarizing plate between the surface illumination apparatus 1 and the liquid-crystal display panel 101. Hence, the output light 15 of the surface illumination apparatus 1 which illuminates the liquid-crystal display panel 101 is incident upon the liquid-crystal display panel 101 without passing through any polarizing plate. Specifically, the surface illumination apparatus 1 and the liquid-crystal display panel 101 are positioned in such a way that the polarization-axis angle of the output light 15 emitted from the surface illumination apparatus 1 becomes a predetermined angle with respect to the polarization-axis angle of a polarizing plate 106 on the view side of the liquid-crystal display panel 101.

In other words, the output light 15 emitted from the one main-surface portion 13b of the light guide plate 13 is linearly S-polarized (or P-polarized) light. Therefore, the liquid-crystal display panel 101 and the surface illumination apparatus 1 are positioned in such a way that its polarization inclination becomes a predetermined value with respect to the orientation of a liquid crystal layer 103 of the liquid-crystal display panel 101 and the polarizing plate 106 on the view side. This helps save one polarizing plate on the side of the surface illumination apparatus 1.

For example, in the case where no voltage is applied to the liquid crystal layer 103 in a TN (twisted-nematic) liquid-crystal orientation mode, the liquid-crystal display panel 101 and the surface illumination apparatus 1 are positioned in such a way that the polarizing plate 106 transmits a linearly-polarized laser beam by rotating its polarization axis using an optical rotating power caused by a twisted liquid-crystal molecule in the liquid crystal layer 103. This realizes a normally white display. On the other hand, if a voltage is given to the liquid crystal 103, the twist of a liquid crystal molecule disappears to thereby produce no optical rotating power. Hence, the polarization axis is not rotated, and the linearly-polarized laser beam as it is reaches the polarizing plate 106. Then, it is cut off and is not transmitted, and a black display appears. In contrast, if they are positioned in such a way that the polarizing plate 106 cuts off the linearly-polarized laser beam with applying no voltage to the liquid crystal 103, then a normally black display appears. If a voltage is given to the liquid crystal 103, the liquid crystal 103 and the polarizing plate 106 transmit the laser beam, so that a white display is obtained.

In order to widen the viewing angle of a display by diffusing a laser beam, the liquid crystal display 100 is provided with a diffusing plate 108 on top of the polarizing plate 106 of the liquid-crystal display panel 101. The diffusing plate 108 should desirably be a diffusing plate capable of scattering light forward widely and rearward narrowly. This diffusing plate 108 largely broadens a laser beam forward and scatters it, so that the viewing angle of a display becomes wider. This enables a viewer to watch the display obliquely around it, thus improving the quality of an image to be displayed by the liquid crystal display 100.

In order to widen the viewing angle, at least a pixel-unit micro-lens array may be provided near right behind the row of pixels, or on top of the polarizing plate 106 of the liquid-crystal display panel 101. A laser beam goes straight from the one main-surface portion 13b of the light guide plate 13 and is controlled and emitted by a pixel 105 of the liquid-crystal display panel 101. Then, a micro-lens diffuses this laser beam all around, so that the viewing angle of a displayed image can be widened.

As described above, the liquid crystal display 100 does not need any polarizing plate on the side of the surface illumination apparatus 1. Therefore, a laser beam (not shown) from a laser light source (not shown) can be efficiently incident upon the liquid-crystal display panel 101. This helps heighten the luminance and reduce the power consumption.

The liquid-crystal display panel 101 has a transmission-type or semi-transmission-type formation, and for example, it has a TFT active-matrix-type formation. Its display area is provided with, as shown in FIG. 4, many pixels 105 which are each made up of a red pixel portion (or R-sub-pixel) 105R, a green pixel portion (or G-sub-pixel) 105G and a blue pixel portion (or B-sub-pixel) 105B. It is driven by a TFT. The liquid crystal 103 is oriented and disposed between two glass substrates 102 and 104. The TFT for driving the liquid crystal 103 is formed in either of the glass substrates 102 and 104, but it is not shown in any figures. This liquid-crystal display panel 101 has a conventionally-employed configuration, which is formed only by removing one polarizing plate on the side of the surface illumination apparatus 1, and thus, a further description is omitted.

As described earlier, the TN mode is used as the liquid-crystal orientation mode in the liquid-crystal display panel 101. However, a conventionally-employed orientation mode other than the TN mode can also be used including a VA (homeotropic) mode, an OCB mode, an IPS (In-Plane-Switching) mode, a variation of these modes and the like. This makes it possible to further improve the quality of an image to be displayed, such as a viewing angle and a responsibility.

As described so far, the liquid crystal display 100 is provided with this surface illumination apparatus 1 capable of emitting the uniformly-polarized output light. This helps enhance its light usage efficiency, heighten the luminance or reduce the power consumption. Furthermore, in a second embodiment of the present invention described later, a laser light source is made up of an R-light source, a G-light source and a B-light source which emit each laser beam. A semiconductor laser light source or an SHG laser light source is used as the laser light source. Thereby, the purity of color becomes better, thus helping enlarge the range of color reproduction drastically. As a result, an image can be displayed with a higher picture quality than that of a system provided with a backlight illumination unit including a vacuum fluorescent display or an LED light source in conventional use.

According to this configuration, the surface illumination apparatus 1 as the backlight illumination unit emits a uniformly-polarized laser beam. This contributes to realizing the liquid crystal display which is capable of obtaining a greater luminance, utilizing light more efficiently and securing lower power consumption and sufficiently-reduced speckle noise. Besides, a polarizing plate can be saved on the incidence side between the surface illumination apparatus 1 and the liquid-crystal display panel 101. Therefore, the liquid crystal display 100 can utilize a laser beam from the surface illumination apparatus 1 more efficiently and reduce the power consumption. At the same time, its cost becomes lower.

An example is above given in which no polarizing plate is provided between the surface illumination apparatus 1 and the liquid-crystal display panel 101. However, a polarizing plate may be provided between a surface illumination apparatus and a liquid-crystal display panel. In that case, the polarization axis of the polarizing plate between the surface illumination apparatus and the liquid-crystal display panel is set to coincide with the polarization axis of output light emitted from a light guide plate. This results in the liquid crystal display being capable of further improving the light usage efficiency, heightening the luminance or reducing the power consumption. In this case, a diffusing plate can also be provided on one main-surface portion of the polarizing plate of the surface illumination apparatus. This makes it possible to widen the angle of a visual field.

Second Embodiment

Figure 5:
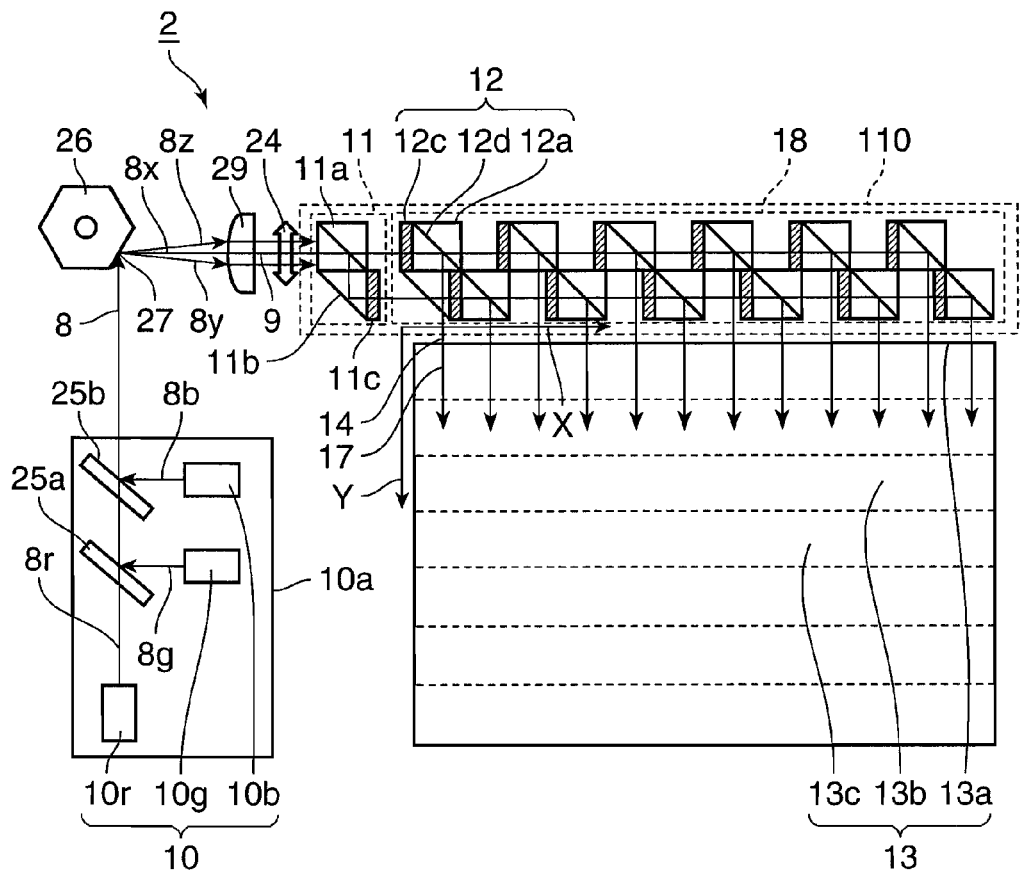
FIG. 5 is a top plan view showing a configuration of a surface illumination apparatus according to a second embodiment of the present invention.

FIG. 5 is a top plan view showing a configuration of a surface illumination apparatus 2 according to a second embodiment of the present invention. In FIG. 5, in the same way as FIG. 1 and FIG. 2, each component element of the surface illumination apparatus 1 is arranged apart from each other for the purpose of helping understanding of their configurations. However, in the actual configurations, they are disposed on a base plate (not shown), in a framework (not shown) or the like, and all of them are united and fixed.

The surface illumination apparatus 2 shown in FIG. 5 differs from the surface illumination apparatus 1 shown in FIG. 1 in the following respects. It includes a laser light source made up of several laser light sources and scans a laser beam incident upon an end-surface light-guide portion. As shown in FIG. 5, a laser light source 10 of the surface illumination apparatus 2 is made up of an R-light source 10r, a G-light source 10g and a B-light source 10b which emit at least red light (R-light), green light (G-light) and blue light (B-light), respectively. Laser beams 8r, 8g and 8b are each incident upon the end-surface light-guide portion 110 and are emitted as the output light (not shown) from the one main-surface portion 13b of the light guide plate 13.

At this time, the uniformly-polarized R-light, G-light and B-light are emitted as the output light. Hence, it is useful as a surface illumination apparatus for a color liquid-crystal display. Its color reproducibility as well is far better than a surface illumination apparatus provided with an LED light source or the like. As shown in FIG. 5, the laser light source 10 is made up of the R-light source 10r, the G-light source 10g and the B-light source 10b. The R-light laser beam 8r, G-light laser beam 8g and B-light laser beam 8b are collected into a single laser beam 8 by dichroic mirrors 25a and 25b and incident upon the end-surface light-guide portion 110 through the same optical path.

Herein, a laser-beam scanning portion 10a holds together the laser light source 10 (the R-light source 10r, the G-light source 10g and the B-light source 10b) and the dichroic mirrors 25a and 25b. It supports them in such a way that they can move in a thickness direction Z of the light guide plate 13. The laser-beam scanning portion 10a vibrates the laser light source 10 and the dichroic mirrors 25a and 25b in the thickness direction Z of the light guide plate 13.

As shown in FIG. 5, the laser beam 8 is scanned in at least any one direction perpendicular to the optical axis shown by a laser beam 8x, for example, in a direction 24 parallel to the short-side direction Y before being incident upon the light introduction portion 11 of the end-surface light-guide portion 110. Specifically, the laser beam 8 is scanned, for example, over the range from a laser beam 8y to a laser beam 8z around the laser beam 8x in the direction 24 along the short-side direction Y by a mirror surface 27 of a polygon mirror 26. Then, each laser beam 8x, 8y and 8z becomes parallel to the optical axis through a cylindrical lens 29 and is incident almost perpendicularly upon the light introduction portion 11 through a mutually-parallel optical path.

According to this configuration, the output light (not shown) is emitted from a temporally different position of the light guide plate 13. This makes it possible to emit light outputted from the one main-surface portion 13b of the light guide plate 13 as the output light unified over its surface and uniformly polarized. Besides, the light which illuminates a specific point is changed and emitted in time series from several places of the light guide plate 13. This helps emit the output light whose speckle noise is sufficiently reduced.

In this embodiment, the laser-beam scanning portion 10a and the polygon mirror 26 scan a laser beam two-dimensionally. However, each scanning means is not limited especially to this example, and thus, another scanning means may be used. This respect is applied to the other embodiments.

Third Embodiment

Figure 6:
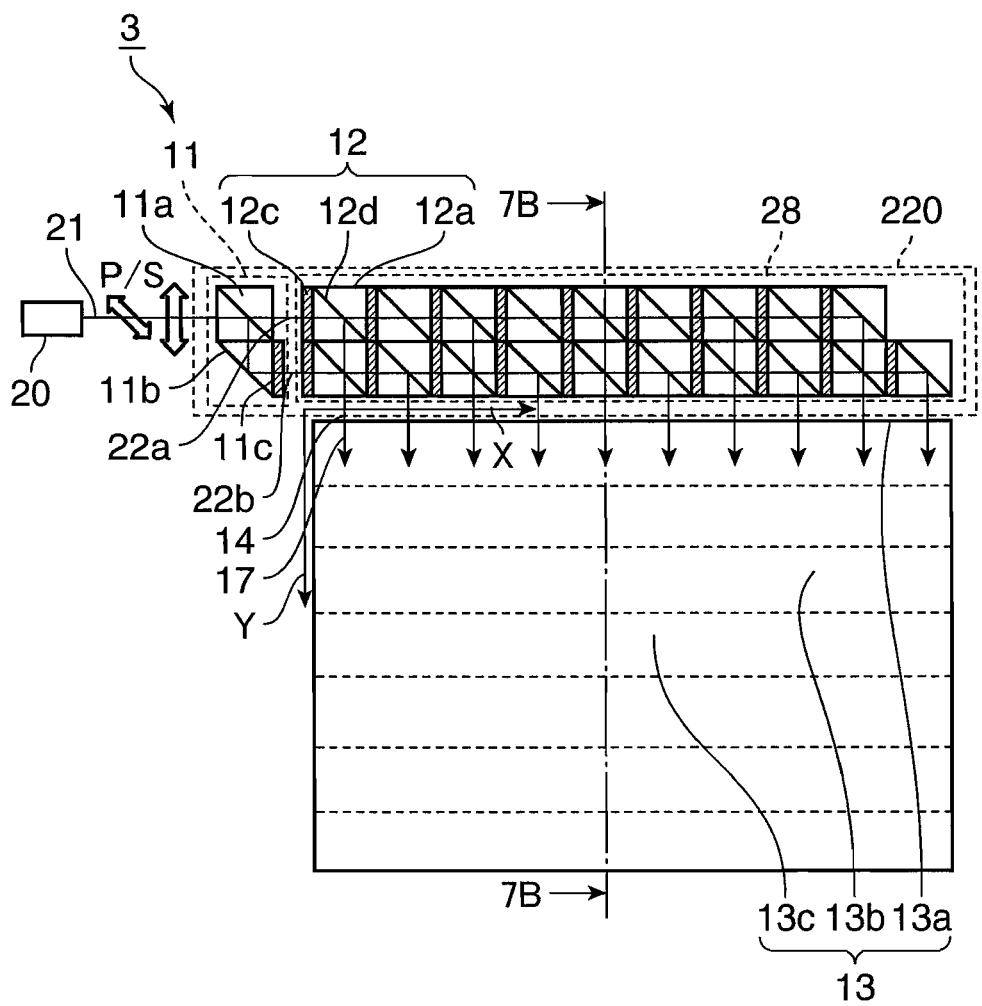
FIG. 6 is a top plan view showing a configuration of a surface illumination apparatus according to a third embodiment of the present invention.
Figure 7:
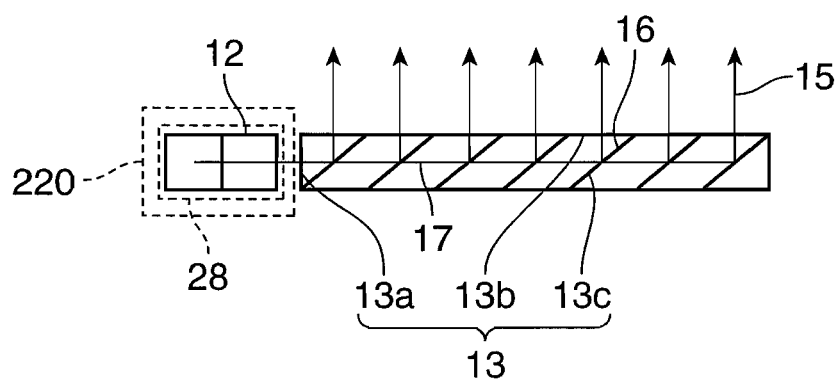
FIG. 7 is a schematic sectional view of the surface illumination apparatus, seen along a 7B-7B line shown in FIG. 6.

FIG. 6 and FIG. 7 show a schematic configuration of a surface illumination apparatus 3 according to a third embodiment of the present invention. FIG. 6 is a top plan view showing a typical configuration of the surface illumination apparatus 3. FIG. 7 is a schematic sectional view of the surface illumination apparatus 3, seen along a 7B-7B line of FIG. 6. In FIG. 6 and FIG. 7, in the same way as FIG. 1 and FIG. 2, each component element of the surface illumination apparatus 3 is arranged apart from each other for the purpose of helping understand their configurations. However, in the actual configurations, they are disposed on a base plate (not shown), in a framework (not shown) or the like, and all of them are united and fixed.

As shown in FIG. 6 and FIG. 7, the surface illumination apparatus 3 includes an end-surface light-guide portion 220. The end-surface light-guide portion 220 has the light introduction portion 11 and a light distribution portion 28. The light distribution portion 28 is provided with the polarization control portions 12 arranged at least in two rows in the long-side direction X. Herein, for example, two rows are arranged as the polarization control portion 12 of the light distribution portion 28. As explained in the first embodiment, each polarization control portion 12 is made up of a combination of the polarizing prism 12a and the half-wave plate 12c and is set parallel in two rows.

As shown in FIG. 5, a laser light source 20 includes laser light sources (not shown) each of which emits at least the R-light, the G-light and the B-light. The R-light, the G-light and the B-light are collected into a laser beam 21 and emitted from the laser light source 20. Then, the laser beam 21 is divided, as mentioned in the first and second embodiments, into two P-polarized laser beams 22a and 22b by the light introduction portion 11. Then, they are incident upon the light distribution portion 28.

The laser beams 22a and 22b incident as two parallel P-polarized laser beams upon the light distribution portion 28 in this way each pass through the half-wave plate 12c of the polarization control portion 12. Thereby, they are each converted into a P/S polarized laser beam. The PBS surface 12d transmits the P-polarization component of this laser beam at substantially 100%. On the other hand, the PBS surface 12d reflects the S-polarization component of the laser beam at almost 100%. This S-polarization component is turned at a right angle and emitted toward the end-surface portion 13a of the light guide plate 13.

The polarization control portions 12 arranged in parallel in two rows each have the same optical function as described above. They propagate P-polarized light in the long-side direction X and emit S-polarized light in the short-side direction Y. It allows parallel S-polarized beams to be incident upon the light guide plate 13. When one wants P-polarized light to be incident upon the light guide plate 13, as described in the first embodiment, a half-wave plate can be inserted in front of the end-surface portion 13a. On the other hand, when S-polarized light is incident upon the end-surface portion 13a, there is no need for any half-wave plate.

According to this configuration, among the polarization control portions 12 arranged in two rows in the long-side direction X, the polarizing prism 12a of each polarization control portion 12 in the first row (on the upper side in FIG. 6) reflects an S-polarized laser beam. Further, the polarizing prism 12a of each polarization control portion 12 arranged in the second row (on the lower side in FIG. 6) and the following reflects the reflected S-polarized laser beam repeatedly. Thereafter, these S-polarized (or P-polarized) laser beams are incident upon the light guide plate 13. Therefore, the output light emitted from the one main-surface portion 13b of the light guide plate 13 has a better uniformity over its whole surface and a further uniform polarization. At the same time, such a laser beam can be more efficiently utilized.

As described in the first embodiment, the half-wave plate 12c of each polarization control portion 12 arranged in parallel in two rows can be turned and adjusted. The quantity of an S-polarization component reflected at the PBS surface 12d and the quantity of a P-polarization component transmitted there are adjusted to thereby adjust the distribution of the quantity of light along the long-side direction X of the light guide plate 13. This makes it possible to arbitrarily set the intensity distribution of a uniformly-polarized laser beam substantially in the unit of each polarization control portion 12 along the long-side direction X of the light guide plate 13. For example, in a monitor for a computer or the like, each half-wave plate 12c can be adjusted in such a way that uniform beams are incident upon the light guide plate 13 along the long-side direction X of the end-surface light-guide portion 220. This makes it possible to obtain a uniform luminance distribution over the whole main surface of the light guide plate 13.

A display for a TV set or the like can be designed in such a way that light having a low intensity is incident upon the light guide plate 13 from both ends of the end-surface light-guide portion 220 while light having a high intensity is incident upon the light guide plate 13 from the middle thereof. This is helpful in lightening the middle of the light guide plate 13 watched by a viewer while darkening the side ends of the light guide plate 13. Since the quantity of light increases in the middle of the light guide plate 13, if the output of the laser light source 20 is kept at the same level, a viewer can feel a higher brightness effectively in practice. Conversely, if a viewer tries to feel the same brightness effectively in practice, the output of the laser light source 10 can be lowered, thus saving the power consumption. A viewer does not feel unnatural if the ratio of the quantity of light at the side ends of the light guide plate 13 to the quantity of light in the middle thereof is approximately eighty percent to sixty percent.

In addition, a laser beam incident upon the end-surface light-guide portion 220 may be scanned in at least any one direction perpendicular to the optical axis. Thereby, output light is emitted from a temporally different position of the light guide plate 13. This makes it possible to emit light outputted from the one main-surface portion 13b of the light guide plate 13 as the output light unified over its surface and uniformly polarized. Besides, the light which illuminates a specific point is changed and emitted in time series from several places of the light guide plate 13. This helps emit the output light whose speckle noise is sufficiently reduced.

Fourth Embodiment

Figure 8:
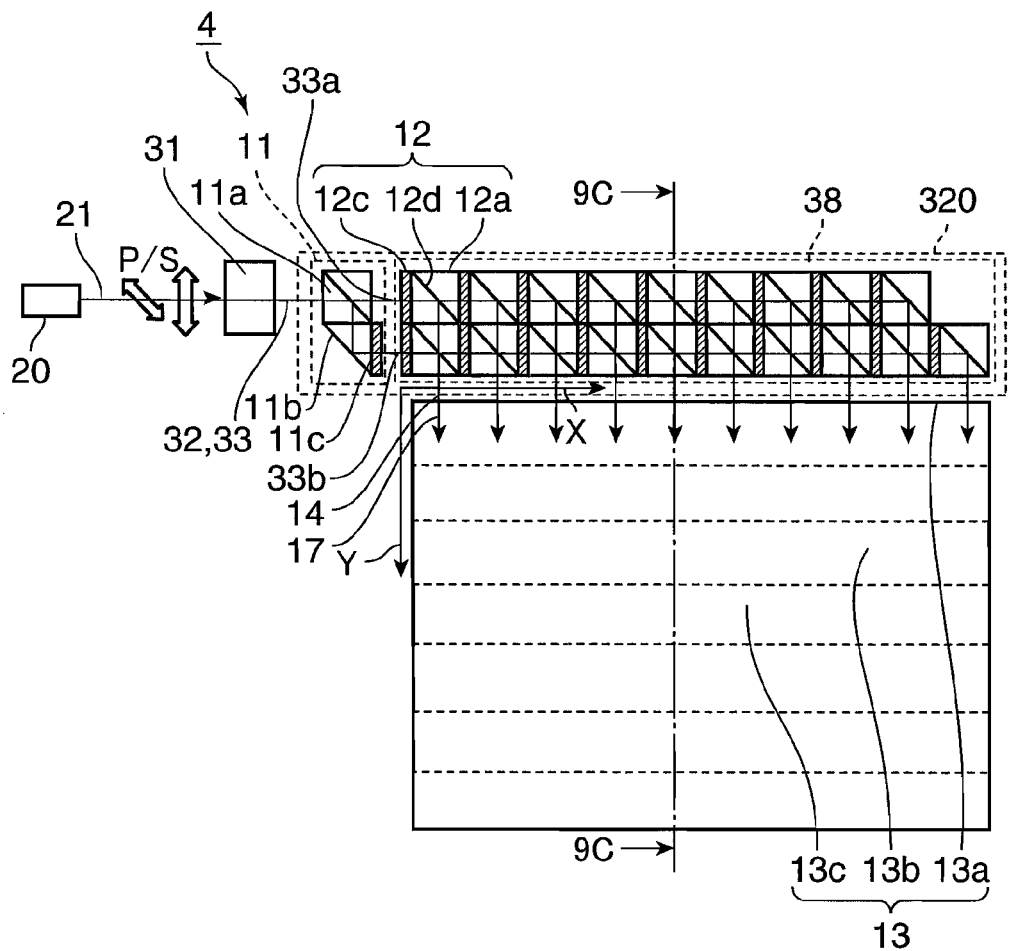
FIG. 8 is a top plan view showing a configuration of a surface illumination apparatus according to a fourth embodiment of the present invention.
Figure 9:
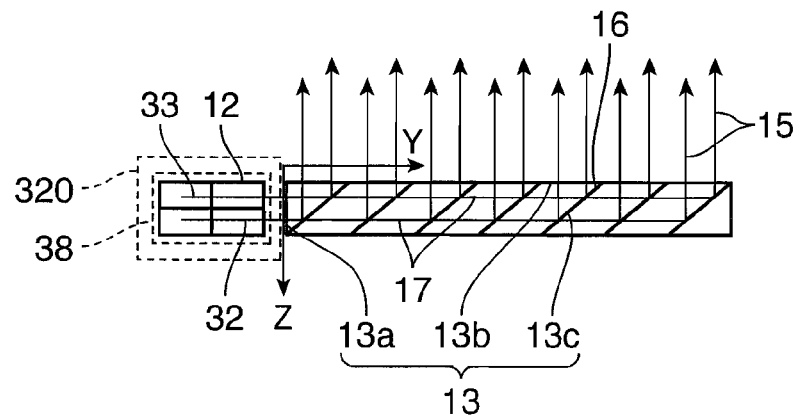
FIG. 9 is a schematic sectional view of the surface illumination apparatus, seen along a 9C-9C line shown in FIG. 8.

FIG. 8 and FIG. 9 show a schematic configuration of a surface illumination apparatus 4 according to a fourth embodiment of the present invention. FIG. 8 is a top plan view showing a typical configuration of the surface illumination apparatus 4. FIG. 9 is a schematic sectional view of the surface illumination apparatus 4, seen along a 9C-9C line of FIG. 8. In FIG. 8 and FIG. 9, in the same way as FIG. 1 and FIG. 2, each component element of the surface illumination apparatus 4 is arranged apart from each other for the purpose of helping understand their configurations. However, in the actual configurations, they are disposed on a base plate (not shown), in a framework (not shown) or the like, and all of them are united and fixed.

As shown in FIG. 8 and FIG. 9, the surface illumination apparatus 4 includes an end-surface light-guide portion 320. The end-surface light-guide portion 320 has the light introduction portion 11 and a light distribution portion 38. The light distribution portion 38 is provided with the polarization control portions 12 arranged at least in two rows and in two tiers in the long-side direction X and in the thickness direction Z, respectively. Herein, for example, two tiers and two rows are arranged as the polarization control portion 12 of the light distribution portion 38. As explained in the first embodiment, each polarization control portion 12 is made up of a combination of the polarizing prism 12a and the half-wave plate 12c and is set parallel in two tiers and in two rows.

As shown in FIG. 5, the laser light source 20 includes laser light sources (not shown) each of which emits at least the R-light, the G-light and the B-light. The R-light, the G-light and the B-light are collected into the laser beam 21 and emitted from the laser light source 20. Then, the laser beam 21 passes through a light branching portion 31 ahead of the light introduction portion 11 and branches into two laser beams 32 and 33 in the thickness direction Z of the light guide plate 13. Using two such light introduction portions 11 each disposed in the thickness direction Z, the two laser beams 32 and 33 are each divided, as mentioned in the first embodiment, further into two P-polarized laser beams.

Herein, the laser beam 33 is described as an example. The laser beam 33 in the upper tier is divided into two P-polarized laser beams 33a and 33b and incident upon the light distribution portion 38 in the upper tier. The laser beams 33a and 33b incident as two parallel P-polarized laser beams upon the light distribution portion 38 in the upper tier in this way each pass through the half-wave plate 12c of the polarization control portion 12 in the upper tier. Thereby, they are each converted into a P/S polarized laser beam. The PBS surface 12d transmits the P-polarization component of this laser beam at substantially 100%. On the other hand, the PBS surface 12d reflects the S-polarization component of the laser beam at almost 100%. This S-polarization component is turned at a right angle and emitted toward the upper part of the end-surface portion 13a of the light guide plate 13. In the same way as the above, the laser beam 32 in the lower tier is also transmitted and reflected by the light distribution portion 38 in the lower tier. Then, it is emitted toward the lower part of the end-surface portion 13a of the light guide plate 13.

The polarization control portions 12 arranged in parallel in two rows each have the same optical function as described above. They propagate P-polarized light in the long-side direction X and emit S-polarized light in the short-side direction Y. It allows parallel S-polarized beams to be incident upon the light guide plate 13. When one wants P-polarized light to be incident upon the light guide plate 13, as described in the first embodiment, a half-wave plate can be inserted in front of the end-surface portion 13a. On the other hand, when S-polarized light is incident upon the end-surface portion 13a, there is no need for any half-wave plate.

According to this configuration, among the polarization control portions 12 arranged in two rows in the long-side direction X at each of the two tiers in the thickness direction, the polarizing prism 12a of each polarization control portion 12 in the first row reflects an S-polarized laser beam. Further, the polarizing prism 12a of each polarization control portion 12 arranged in the second row and the following reflects the reflected S-polarized laser beam repeatedly. Thereafter, these S-polarized (or P-polarized) laser beams are incident upon the light guide plate 13. Therefore, the output light emitted from the one main-surface portion 13b of the light guide plate 13 has a better uniformity over its whole surface and a further uniform polarization. At the same time, such a laser beam can be more efficiently utilized. Moreover, in this embodiment, the polarization control portions 12 are arranged in two tiers in the thickness direction likewise to thereby allow a laser beam to further branch into a plurality of ones. This makes it possible to further unify the luminance distribution of the output light emitted from the one main-surface portion 13b of the light guide plate 13, as well as adjust the light quantity more precisely.

Fifth Embodiment

Figure 10:
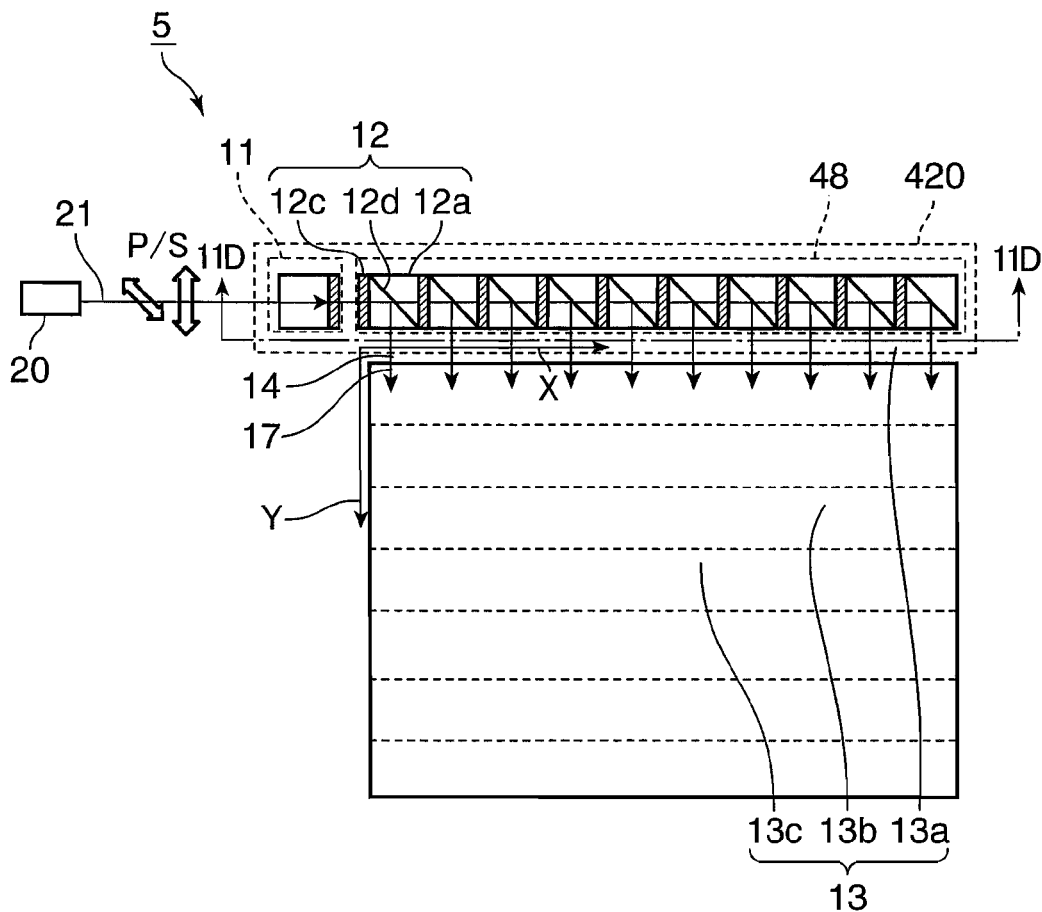
FIG. 10 is a top plan view showing a configuration of a surface illumination apparatus according to a fifth embodiment of the present invention.
Figure 11:
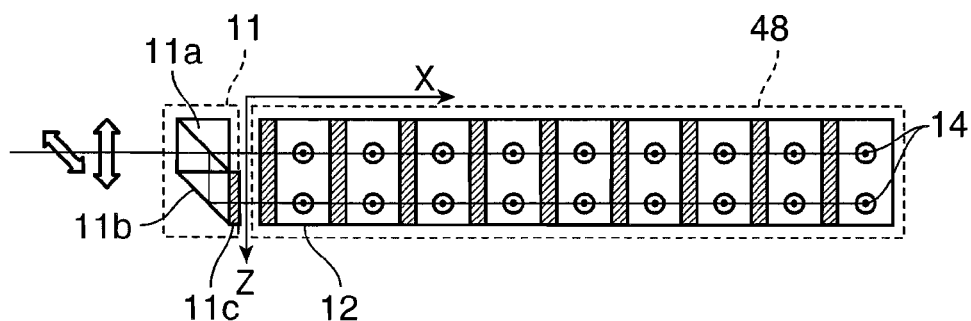
FIG. 11 is a schematic sectional view of the surface illumination apparatus, seen along an 11D-11D line shown in FIG. 10.

FIG. 10 and FIG. 11 show a schematic configuration of a surface illumination apparatus 5 according to a fifth embodiment of the present invention. FIG. 10 is a top plan view showing a typical configuration of the surface illumination apparatus 5. FIG. 11 is a schematic sectional view of an end-surface light-guide portion 420, seen along an 11D-11D line of FIG. 10. In FIG. 10 and FIG. 11, in the same way as FIG. 1 and FIG. 2, each component element of the surface illumination apparatus 5 is arranged apart from each other for the purpose of helping understand their configurations. However, in the actual configurations, they are disposed on a base plate (not shown), in a framework (not shown) or the like, and all of them are united and fixed.

As shown in FIG. 10 and FIG. 11, the surface illumination apparatus 5 includes the end-surface light-guide portion 420. The end-surface light-guide portion 420 has the light introduction portion 11 and a light distribution portion 48. The light introduction portion 11 is disposed so as to separate polarized light in the thickness direction Z. The light distribution portion 48 guides the light obtained through the separation by the light introduction portion 11 to the light guide plate 13. The polarization control portions 12 are arranged in a row in the direction Y. As described in the first embodiment, each polarization control portion 12 is made up of a combination of the polarizing prism 12a and the half-wave plate 12c.

As shown in FIG. 5, the laser light source 20 includes laser light sources (not shown) each of which emits at least the R-light, the G-light and the B-light. The R-light, the G-light and the B-light are collected into the laser beam 21 and emitted from the laser light source 20. Using the light introduction portion 11 disposed in the thickness direction Z, the laser beam 21 is divided, as mentioned in the first embodiment, into two P-polarized laser beams.

In this way, the laser beams incident as two parallel P-polarized laser beams upon the light distribution portion each pass through the half-wave plate 12c of each polarization control portion 12. Thereby, they are each converted into a P/S polarized laser beam. The PBS surface 12d transmits each P-polarization component of the two laser beams at substantially 100%. On the other hand, the PBS surface 12d reflects the S-polarization component of the laser beam at almost 100%. This S-polarization component is turned at a right angle and emitted toward the end-surface portion 13a of the light guide plate 13. When one wants P-polarized light to be incident upon the light guide plate 13, as described in the first embodiment, a half-wave plate can be inserted in front of the end-surface portion 13a. On the other hand, when S-polarized light is incident upon the end-surface portion 13a, there is no need for any half-wave plate.

According to this configuration, the P-polarized laser beams in two tiers emitted from the light introduction portion 11 disposed so as to separate polarized light in the thickness direction Z is incident as S-polarized (or P-polarized) laser beam upon the light guide plate 13. Therefore, the output light from the one main-surface portion of the light guide plate has a better uniformity over its whole surface and a further uniform polarization. At the same time, such a laser beam can be more efficiently utilized. In this way, if a laser beam turns into a plurality of ones, that helps further unify the luminance distribution of the output light emitted from the one main-surface portion of the light guide plate, or adjust the light quantity more precisely. Besides, the light distribution portion 48 is provided with the single row of polarization control portions 12, so that the surface illumination apparatus 5 becomes smaller.

As described in the first embodiment, the half-wave plate 12c of each polarization control portion 12 can be turned and adjusted. The quantity of an S-polarization component reflected at the PBS surface 12d and the quantity of a P-polarization component transmitted there are adjusted to thereby adjust the distribution of the quantity of light along the long-side direction X of the light guide plate 13. This makes it possible to arbitrarily set the intensity distribution of a uniformly-polarized laser beam substantially in the unit of each polarization control portion 12 along the long-side direction X of the light guide plate 13. Besides, a viewer can adjust the light-quantity distribution arbitrarily by turning the half-wave plate 12c.

In addition, a laser beam incident upon the end-surface light-guide portion 420 may be scanned in at least any one direction perpendicular to the optical axis. Thereby, output light is emitted from a temporally different position of the light guide plate 13. This makes it possible to emit light outputted from the one main-surface portion 13b of the light guide plate 13 as the output light unified over its surface and uniformly polarized. This also helps emit the output light whose speckle noise is sufficiently reduced.

Sixth Embodiment

Figure 12:
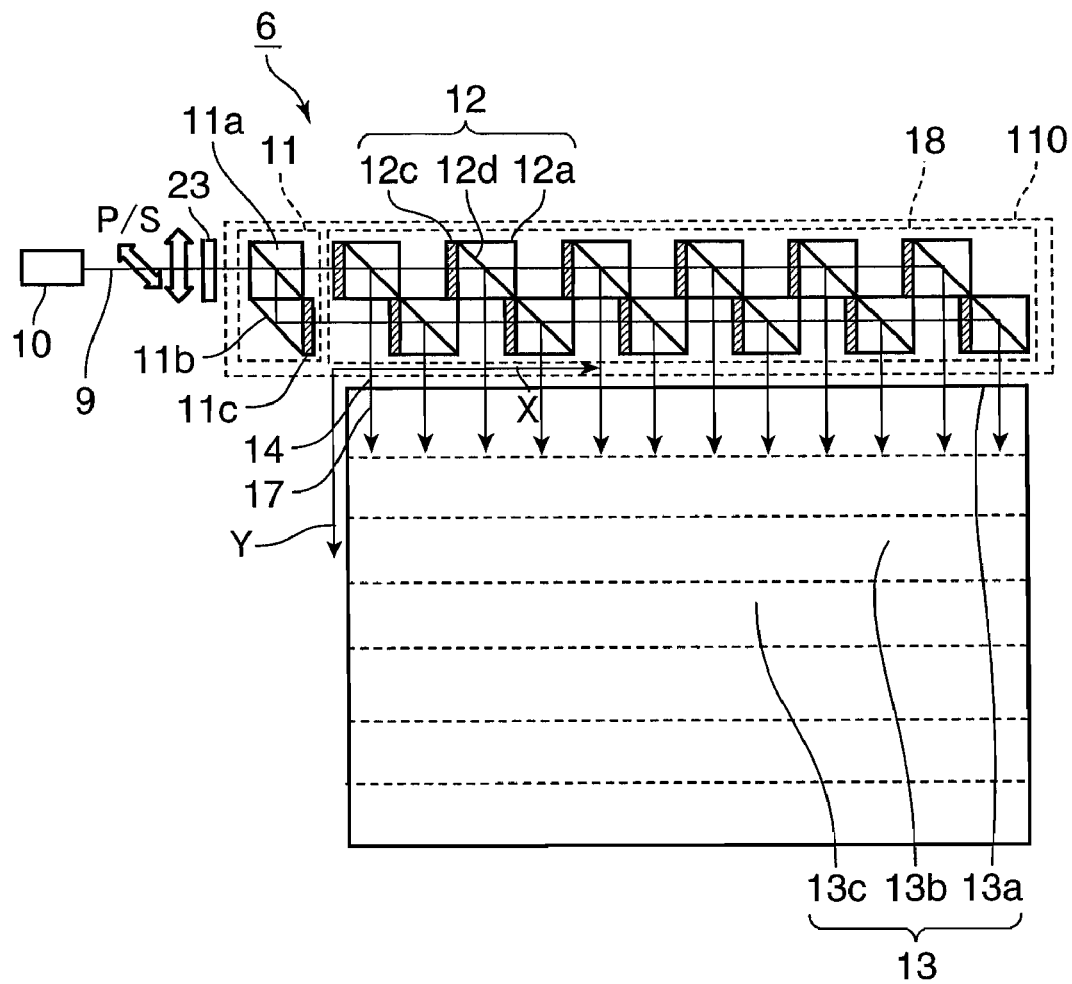
FIG. 12 is a top plan view showing a configuration of a surface illumination apparatus according to a sixth embodiment of the present invention.

FIG. 12 is a top plan view showing a configuration of a surface illumination apparatus 6 according to a sixth embodiment of the present invention. In FIG. 12, in the same way as FIG. 1 and FIG. 2, each component element of the surface illumination apparatus 6 is arranged apart from each other for the purpose of helping understand their configurations. However, in the actual configurations, they are disposed on a base plate (not shown), in a framework (not shown) or the like, and all of them are united and fixed.

The surface illumination apparatus 6 shown in FIG. 12 differs from the surface illumination apparatus 1 shown in FIG. 1 in the following point. It includes a liquid-crystal phase modulator 23 between the laser light source 10 and the end-surface light-guide portion 110 (the light introduction portion 11). Its other configurations are the same as the surface illumination apparatus 1 of FIG. 1. Hence, the component elements are given the same reference characters and numerals, and thus, their description is omitted.

As shown in FIG. 12, a linearly-polarized laser beam emitted from the laser light source 10 is incident upon the liquid-crystal phase modulator 23. The liquid-crystal phase modulator 23 includes a plurality of pixels arranged in a matrix form. It controls the twist angle of the liquid crystal of each pixel according to whether a voltage is applied. Thereby, it controls the polarization plane of a laser beam which passes through any pixel of the plurality of pixels. Each pixel of the liquid-crystal phase modulator 23 is controlled by a control circuit (not shown).

Figure 13:
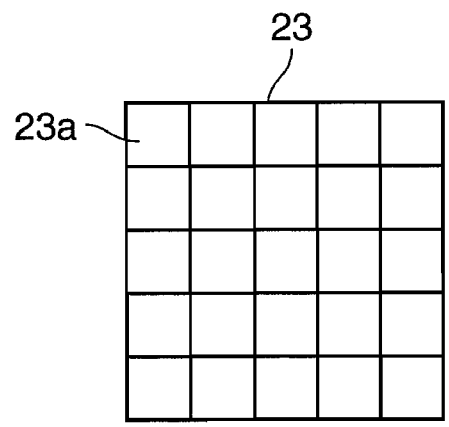
FIG. 13 is a plan view of a liquid-crystal phase modulator shown in FIG. 12.
Figure 14:
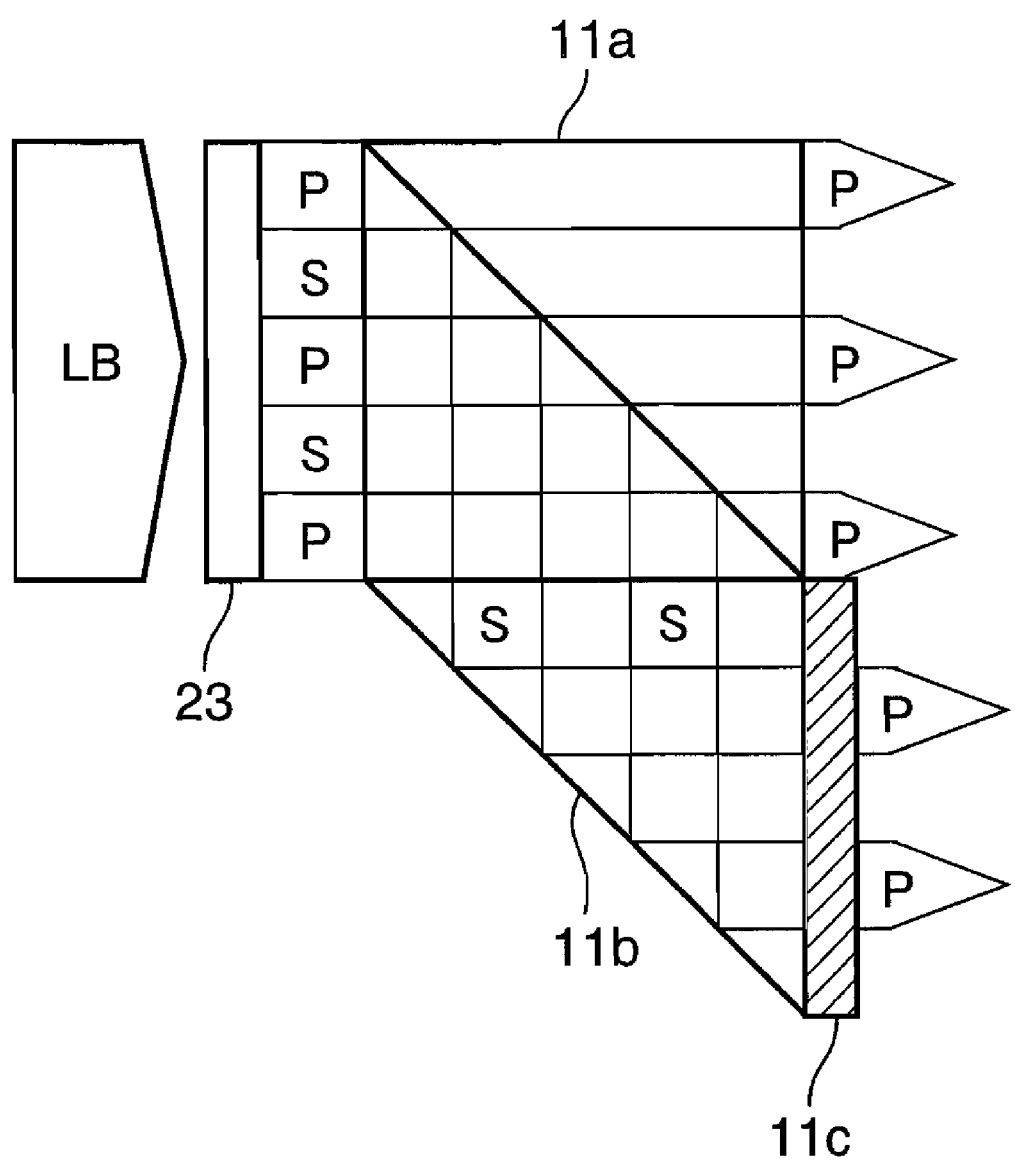
FIG. 14 is an illustration showing how to control a polarization plane of transmitted light using the liquid-crystal phase modulator shown in FIG. 13.

FIG. 13 is a plan view of the liquid-crystal phase modulator 23 shown in FIG. 12. FIG. 14 is an illustration showing how to control a polarization plane of transmitted light using the liquid-crystal phase modulator 23 shown in FIG. 13. As shown in FIG. 13, for example, the liquid-crystal phase modulator 23 includes 5×5 pixels 23a. Among the five pixels in the first row, each pixel in the first, third and fifth lines converts a linearly-polarized laser beam LB into P-polarized light and emits it. On the other hand, each pixel in the second and fourth lines converts the linearly-polarized laser beam LB into S-polarized light and emits it. In such a case, as shown in FIG. 14, the polarizing prism 11a transmits the P-polarized light emitted from each pixel of the first, third and fifth lines. In contrast, the polarizing prism 11a (PBS surface) reflects the S-polarized light emitted from each pixel of the second and fourth lines. Then, the S-polarized light is reflected by the mirror 11b and turns in the long-side direction X. It is converted into P-polarized light by the half-wave plate 11c. Each pixel in the other rows similarly operates, so that the polarization plane of a laser beam which passes through any pixel can be controlled. This makes it possible to scan the laser beam two-dimensionally. The subsequent operation is the same as the surface illumination apparatus 1 shown in FIG. 1.

In this way, in this embodiment, the liquid-crystal phase modulator 23 controls the polarization plane of transmitted light for each pixel, so that the laser beam can be two-dimensionally scanned. Therefore, in the same way as the second embodiment, the output light (not shown) is emitted from a temporally different position of the light guide plate 13. This makes it possible to emit light outputted from the one main-surface portion 13b of the light guide plate 13 as the output light unified over its surface and uniformly polarized. Besides, the light which illuminates a specific point is changed and emitted in time series from several places of the light guide plate 13. This helps emit the output light whose speckle noise is sufficiently reduced. Besides, light can be electrically two-dimensionally scanned without a mechanical member such as a polygon mirror. This contributes to simplifying the configuration of the apparatus.

Instead of the surface illumination apparatus 1 of FIG. 4 according to the first embodiment, each surface illumination apparatus 2 to 6 may also configure the liquid crystal display 100. According to this configuration, such a surface illumination apparatus as the backlight illumination unit emits a uniformly-polarized laser beam. This realizes a liquid crystal display which is capable of heightening the luminance, improving the light usage efficiency, decreasing the power consumption and reducing the speckle noise sufficiently. In addition, a polarizing plate can be saved on the incidence side between the surface illumination apparatus and the liquid-crystal display panel. Therefore, the liquid crystal display provided with the surface illumination apparatus according to each embodiment can utilize a laser beam from the surface illumination apparatus more efficiently and reduce the power consumption. At the same time, its cost becomes lower.

On the basis of each such embodiment as described so far, the present invention is summarized as follows. Specifically, a surface illumination apparatus according to the present invention includes: a light source; an end-surface light-guide portion which guides light emitted from the light source in a long-side direction thereof and generates emitted light in a short-side direction thereof; and a light guide plate which allows the emitted light to be incident upon an end-surface portion thereof and emits the incident light from one main-surface portion thereof, in which: the end-surface light-guide portion includes a plurality of polarization control portions arranged in the long-side direction; the plurality of polarization control portions each have a half-wave plate and a polarizing prism; the end-surface light-guide portion emits the emitted light in the form of either of S-polarized light and P-polarized light, using the plurality of polarization control portions; and the light guide plate emits, as output light, either of S-polarized light and P-polarized light from the one main-surface portion.

This surface illumination apparatus is capable of, even if randomly-polarized light is incident from the light source, utilizing this light without wasting light and with the light being uniformly polarized. It is also capable of emitting, from the one main-surface portion of the light guide plate, uniformly-polarized light having a uniform intensity over its surface. This realizes the surface illumination apparatus capable of utilizing light from the light source more efficiently, heightening the luminance and reducing the power consumption.

It is preferable that: the end-surface light-guide portion emits S-polarized light as the emitted light; and the light guide plate emits S-polarized light as the output light from the one main-surface portion.

In this case, even if randomly-polarized light is incident from the light source, this light can be utilized without wasting light and with the light being uniformly polarized. At the same time, from the one main-surface portion of the light guide plate, uniformly S-polarized light having a uniform intensity over its surface can be emitted. Besides, if this surface illumination apparatus is used as a backlight illumination unit, a polarizing plate can be saved on the light-incidence side upon a liquid crystal display. This makes it possible to heighten the luminance, reduce the power consumption and lower the cost of the liquid crystal display.

The above described surface illumination apparatus may further include a half-wave plate between the end-surface light-guide portion and the end-surface portion of the light guide plate; the end-surface light-guide portion may emit S-polarized light as the emitted light; the half-wave plate may convert the S-polarized light into P-polarized light and may emit the P-polarized light to the end-surface portion of the light guide plate; and the light guide plate may emit P-polarized light as the output light from the one main-surface portion.

In this case, even if randomly-polarized light is incident from the light source, this light can be utilized without wasting light and with the light being uniformly polarized. At the same time, from the one main-surface portion of the light guide plate, uniformly P-polarized light having a uniform intensity over its surface can be emitted. Besides, if this surface illumination apparatus is used as a backlight illumination unit, a polarizing plate can be saved on the light-incidence side upon a liquid crystal display. This makes it possible to heighten the luminance, reduce the power consumption and lower the cost of the liquid crystal display.

It is preferable that: the light guide plate includes a plurality of bending mirror portions arranged inside thereof; and the plurality of bending mirror portions reflect a part of the emitted light incident upon the end-surface portion and transmit the rest thereof, and emit, as the output light, either of the S-polarized light and the P-polarized light from the one main-surface portion.

In this case, each bending mirror portion of the light guide plate reflects, toward the one main-surface portion, a part of either the S-polarized light or the P-polarized light incident upon the light guide plate from the end-surface light-guide portion and transmits a part thereof toward a succeeding bending mirror portion. Hence, the reflectance and transmittance of each bending mirror portion can be adjusted to thereby emit light outputted from the one main-surface portion as the output light that is further uniform over the surface and evenly polarized. This contributes to enhancing the light usage efficiency.

It is preferable that each polarization control portion turn the half-wave plate around the optical axis of light emitted from the light source in such a way that the half-wave plate transmits the light emitted from the light source and adjusts the quantity of the S-polarized light and the P-polarized light of the transmitted light to thereby adjust the distribution of the quantity of light in the light guide plate.

In this case, the quantity of the S-polarized light and the P-polarized light of the light propagated through the half-wave plate of each polarization control portion along the long-side direction of the end-surface light-guide portion is adjusted and incident upon the end-surface portion of the light guide plate. Therefore, the light outputted from the one main-surface portion of the light guide plate can be emitted as the output light that is further uniform over the surface and evenly polarized. This contributes to enhancing the light usage efficiency.

For example, in a monitor for a computer or the like, each half-wave plate can be adjusted in such a way that uniform beams are incident upon the light guide plate along the long-side direction of the end-surface light-guide portion. This makes it possible to obtain a uniform luminance distribution over the whole main surface of the light guide plate. Besides, a display for a TV set or the like can be designed in such a way that light having a low intensity is incident upon the light guide plate from both ends of the end-surface light-guide portion while light having a high intensity is incident upon the light guide plate from the middle thereof. This is helpful in lightening the middle of the light guide plate watched by a viewer while darkening the side ends of the light guide plate.

Since the quantity of light increases in the middle of the light guide plate, if the output of the light source is kept at the same level, a viewer can feel a higher brightness effectively in practice. Conversely, if a viewer tries to feel the same brightness effectively in practice, the output of the light source can be lowered, thus saving the power consumption. Incidentally, a viewer does not feel unnatural if the ratio of the quantity of light at the side ends of the light guide plate to the quantity of light in the middle thereof is within a range of sixty percent to eighty percent.

It is preferable that: the end-surface light-guide portion include a light introduction portion upon which light emitted from the light source is incident, and a light distribution portion in which the plurality of polarization control portions are arranged in the long-side direction; and the light introduction portion has: a polarizing prism which transmits the P-polarized light of light emitted from the light source to guide this P-polarized light to the light distribution portion and reflects the S-polarized light thereof; a mirror which reflects the S-polarized light reflected by the polarizing prism; and a half-wave plate which converts the S-polarized light reflected by the mirror into P-polarized light and guides the P-polarized light to the light distribution portion.

In this case, even if randomly-polarized light is incident from the light source, the light introduction portion and the light distribution portion unify the polarization. Then, they introduce at least two branching beams into the light guide plate. This helps make good use of the quantity of the randomly-polarized light to thereby improve the light usage efficiency. Simultaneously, the output light whose speckle noise is sufficiently reduced can be emitted.

It is preferable that: the half-wave plate of each polarization control portion converts P-polarized light incident upon the light introduction portion into light having both components of P-polarized light and S-polarized light; and the polarizing prism of each polarization control portion transmits the P-polarized light of the light having both components of the P-polarized light and the S-polarized light and guide the P-polarized light to the next polarization control portion, and reflects the S-polarized light thereof as the emitted light and guides the S-polarized light to the end-surface portion of the light guide plate.

In this case, P-polarized light incident upon the light introduction portion is converted into light having both components of P-polarized light and S-polarized light. Thereafter, the P-polarized light is transmitted and guided to the next polarization control portion. Then, the S-polarized light is reflected and guided to the light guide plate. Therefore, a plurality of branching uniformly S-polarized beams can be introduced into the light guide plate. This helps make good use of the quantity of the randomly-polarized light to thereby improve the light usage efficiency. Simultaneously, the output light whose speckle noise is sufficiently reduced can be emitted.

It is preferable that each polarization control portion be arranged alternately in two rows in the long-side direction.

In this case, S-polarized light reflected by the polarizing prism of each polarization control portion arranged alternately in the long-side direction is incident upon the light guide plate. Therefore, the light outputted from the one main-surface portion of the light guide plate can be emitted as the output light further uniform over the surface and evenly polarized. This contributes to enhancing the light usage efficiency.

Each polarization control portion may also be arranged at least in two rows in the long-side direction.

In this case, the polarizing prism of each polarization control portion in the first row reflects S-polarized light. Further, the polarizing prism of each polarization control portion arranged in the second row and the following reflects the reflected S-polarized light repeatedly. Thereafter, the S-polarized light is incident upon the light guide plate. Therefore, the light outputted from the one main-surface portion of the light guide plate can be emitted as the output light further uniform over the surface and evenly polarized. This contributes to enhancing the light usage efficiency.

Each polarization control portion may also be arranged at least in two tiers in the thickness directions of the light guide plate.

In this case, the polarizing prism of each polarization control portion in the first tier reflects an S-polarized laser beam. Further, the polarizing prism of each polarization control portion arranged in the second tier and the following reflects the reflected S-polarized laser beam repeatedly. Thereafter, they are incident as S-polarized light upon the light guide plate. Therefore, the light outputted from the one main-surface portion of the light guide plate can be emitted as the output light further uniform over the surface and evenly polarized. This contributes to enhancing the light usage efficiency.

It is preferable that: each polarization control portion be arranged in a row in the long-side direction; and the polarizing prism and the mirror of the light introduction portion be arranged in the thickness directions of the light guide plate.

In this case, P-polarized light in two tiers emitted from the light introduction portion arranged so as to separate polarized light in the thickness direction is incident as S-polarized light upon the light guide plate. Therefore, the light outputted from the one main-surface portion of the light guide plate can be emitted as the output light further uniform over the surface and evenly polarized. This contributes to enhancing the light usage efficiency. Besides, the light distribution portion is provided with the single row of polarization control portions, so that the surface illumination apparatus becomes smaller.

It is preferable that the light source include a laser light source which emits a laser beam.

In this case, a laser beam from a light source can be utilized without wasting and a uniformly-polarized laser beam can be emitted. This realizes the surface illumination apparatus capable of making the luminance higher, improving the light usage efficiency significantly and reducing the power consumption. In addition, the liquid crystal display provided as the backlight illumination unit with this surface illumination apparatus is capable of utilizing a uniformly-polarized laser beam. This makes it possible to heighten the luminance, decrease the power consumption and lower the cost. Besides, the speckle noise can be sufficiently reduced.

It is preferable that the laser beam be scanned in at least any one direction perpendicular to the optical axis of the laser beam before the laser beam is incident upon the end-surface light-guide portion.

In this case, the output light is emitted from a temporally different position of the light guide plate. This makes it possible to emit light outputted from the one main-surface portion of the light guide plate as the output light unified over its surface and uniformly polarized. Besides, the output light whose speckle noise is sufficiently reduced can be emitted.

It is preferable that the above described surface illumination apparatus further includes a liquid-crystal phase modulator which scans the laser beam two-dimensionally before the laser beam is incident upon the end-surface light-guide portion.

In this case, the output light is emitted from a temporally different position of the light guide plate. This makes it possible to emit light outputted from the one main-surface portion of the light guide plate as the output light unified over its surface and uniformly polarized. Besides, the output light whose speckle noise is sufficiently reduced can be emitted. Besides, light can be electrically two-dimensionally scanned without a mechanical member such as a polygon mirror. This contributes to simplifying the configuration of the apparatus.

It is preferable that: the laser light source be formed by a light source which emits at least red light, green light and blue light; and a laser beam of each color be incident along the same optical path upon the end-surface light-guide portion and be emitted as the output light from the one main-surface portion of the light guide plate.

In this case, uniformly-polarized red, green and blue laser beams are emitted as the output light from the light guide plate. Hence, it is useful as a surface illumination apparatus for a color liquid-crystal display. Its color reproducibility as well is far better than a surface illumination apparatus provided with an LED light source or the like.

A liquid crystal display according to another aspect of the present invention includes: a liquid-crystal display panel; and a backlight illumination unit which illuminates the liquid-crystal display panel from behind, in which the backlight illumination unit is the above described surface illumination apparatus.

In this liquid crystal display, the surface illumination apparatus as the backlight illumination unit emits uniformly-polarized light. This realizes a liquid crystal display which is capable of heightening the luminance, improving the light usage efficiency, decreasing the power consumption and reducing the speckle noise sufficiently. In addition, a polarizing plate can be saved on the incidence side between the surface illumination apparatus and the liquid-crystal display panel. Therefore, a laser beam from the surface illumination apparatus can be more efficiently utilized and its power consumption can be reduced. At the same time, its cost becomes lower.

The surface illumination apparatus according to the present invention is capable of, if a laser light source is used as the light source, then unifying the polarization of a laser beam from the laser light source and taking out the output light having a uniform polarization and a lower speckle noise at a higher light usage efficiency from the surface of the light guide plate. The liquid crystal display provided with this surface illumination apparatus is capable of heightening the luminance and reducing the power consumption. Therefore, it is useful, for example, for a flat large-screen liquid-crystal display or the like.

This application is based on Japanese patent application serial No. 2007-098155, filed in Japan Patent Office on Apr. 4, 2007, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A surface illumination apparatus, comprising:
   a light source;
   an end-surface light-guide portion which guides light emitted from the light source in a long-side direction thereof and generates emitted light in a short-side direction thereof; and
   a light guide plate which allows the emitted light to be incident upon an end-surface portion thereof and emits the incident light from one main-surface portion thereof, wherein:
   the end-surface light-guide portion includes a plurality of polarization control portions arranged in the long-side direction;
   the plurality of polarization control portions each have a half-wave plate and a polarizing prism;
   the end-surface light-guide portion emits the emitted light in the form of either of S-polarized light and P-polarized light, using the plurality of polarization control portions;

the light guide plate emits, as output light, either of S-polarized light and P-polarized light from the one main-surface portion;

the end-surface light-guide portion includes a light introduction portion upon which light emitted from the light source is incident, and a light distribution portion in which the plurality of polarization control portions are arranged in the long-side direction; and the light introduction portion has: a polarizing prism which transmits the P-polarized light of light emitted from the light source to guide the P-polarized light to the light distribution portion and reflects the S-polarized light thereof; a mirror which reflects the S-polarized light reflected by the polarizing prism; and a half-wave plate which converts the S-polarized light reflected by the mirror into P-polarized light and guides the P-polarized light to the light distribution portion.

2. The surface illumination apparatus according to claim 1, wherein:
the end-surface light-guide portion emits S-polarized light as the emitted light; and
the light guide plate emits S-polarized light as the output light from the one main-surface portion.

3. The surface illumination apparatus according to claim 1, wherein:
a half-wave plate is further provided between the end-surface light-guide portion and the end-surface portion of the light guide plate;
the end-surface light-guide portion emits S-polarized light as the emitted light;
the half-wave plate converts the S-polarized light into P-polarized light and emits the P-polarized light to the end-surface portion of the light guide plate; and
the light guide plate emits P-polarized light as the output light from the one main-surface portion.

4. The surface illumination apparatus according to claim 1, wherein:
the light guide plate includes a plurality of bending mirror portions arranged inside thereof; and
the plurality of bending mirror portions reflect a part of the emitted light incident upon the end-surface portion and transmit the rest thereof, and emit, as the output light, either of the S-polarized light and the P-polarized light from the one main-surface portion.

5. The surface illumination apparatus according to claim 1, wherein each polarization control portion turns the half-wave plate around the optical axis of light emitted from the light source in such a way that the half-wave plate transmits the light emitted from the light source and adjusts the quantity of the S-polarized light and the P-polarized light of the transmitted light to thereby adjust the distribution of the quantity of light in the light guide plate.

6. The surface illumination apparatus according to claim 1, wherein:
the half-wave plate of each polarization control portion converts P-polarized light incident upon the light introduction portion into light having components of both P-polarized light and S-polarized light; and
the polarizing prism of each polarization control portion transmits the P-polarized light of the light having components of both the P-polarized light and the S-polarized light and guides the P-polarized light to the next polarization control portion, and reflects the S-polarized light thereof as the emitted light and guides the S-polarized light to the end-surface portion of the light guide plate.

7. The surface illumination apparatus according to claim 6, wherein the polarization control portions are arranged alternately in two rows in the long-side direction.

8. The surface illumination apparatus according to claim 6, wherein the polarization control portions are arranged at least in two rows in the long-side direction.

9. The surface illumination apparatus according to claim 6, wherein the polarization control portions are arranged in at least two tiers in the thickness direction of the light guide plate.

10. The surface illumination apparatus according to claim 6, wherein:
the polarization control portions are arranged in a row in the long-side direction; and
the polarizing prism and the mirror of the light introduction portion are arranged in the thickness direction of the light guide plate.

11. The surface illumination apparatus according to claim 1, wherein the light source includes a laser light source which emits a laser beam.

12. The surface illumination apparatus according to claim 11, wherein the laser beam is scanned in at least any one direction perpendicular to the optical axis of the laser beam before the laser beam is incident upon the end-surface light-guide portion.

13. The surface illumination apparatus according to claim 11, further comprising a liquid-crystal phase modulator which scans the laser beam two-dimensionally before the laser beam is incident upon the end-surface light-guide portion.

14. The surface illumination apparatus according to claim 11, wherein:
the laser light source is formed by a light source which emits at least red light, green light and blue light; and
a laser beam of each color is incident along the same optical path upon the end-surface light-guide portion and is emitted as the output light from the one main-surface portion of the light guide plate.

15. A liquid crystal display, comprising:
a liquid-crystal display panel; and
a backlight illumination unit which illuminates the liquid-crystal display panel from behind,
wherein the backlight illumination unit is the surface illumination apparatus according to claim 1.

* * * * *